(12) United States Patent
Kuri

(10) Patent No.: US 9,998,633 B2
(45) Date of Patent: Jun. 12, 2018

(54) COLOR IRREGULARITY DETECTING DEVICE, IMAGE FORMING APPARATUS, AND COLOR IRREGULARITY DETECTING METHOD

(71) Applicant: Seiko Epson Corporation, Tokyo (JP)

(72) Inventor: Ryohei Kuri, Matsumoto (JP)

(73) Assignee: Seiko Epson Corporation (JP)

( * ) Notice: Subject to any disclaimer, the term of this patent is extended or adjusted under 35 U.S.C. 154(b) by 0 days. days.

(21) Appl. No.: 15/056,132

(22) Filed: Feb. 29, 2016

(65) Prior Publication Data
US 2016/0261774 A1 Sep. 8, 2016

(30) Foreign Application Priority Data
Mar. 3, 2015 (JP) ................................. 2015-041189

(51) Int. Cl.
| H04N 1/60 | (2006.01) |
| G01J 3/46 | (2006.01) |
| G01J 3/50 | (2006.01) |
| G02B 26/00 | (2006.01) |
| H04N 1/00 | (2006.01) |
| G01J 3/26 | (2006.01) |

(52) U.S. Cl.
CPC .............. H04N 1/6044 (2013.01); G01J 3/26 (2013.01); G01J 3/46 (2013.01); G01J 3/463 (2013.01); G01J 3/502 (2013.01); G02B 26/001 (2013.01); H04N 1/00023 (2013.01); H04N 1/00029 (2013.01); H04N 1/00058 (2013.01); H04N 1/6036 (2013.01); G01J 2003/466 (2013.01)

(58) Field of Classification Search
None
See application file for complete search history.

(56) References Cited

U.S. PATENT DOCUMENTS

| 7,583,418 B2 * | 9/2009 | Mestha ..................... G01J 3/02 358/1.9 |
| 2014/0267459 A1 * | 9/2014 | Kanai ................... G01J 3/0218 345/690 |

FOREIGN PATENT DOCUMENTS

| JP | 08-193916 A | 7/1996 |
| JP | 11-142752 A | 5/1999 |
| JP | 2000-258348 A | 9/2000 |
| JP | 2002-225231 A | 8/2002 |
| JP | 2002-286549 A | 10/2002 |

(Continued)

OTHER PUBLICATIONS

Machine translation of Japanese Appl. No. 2002-286549 to Sakuma et al., published Oct. 2002.*

*Primary Examiner* — Paul F Payer
(74) *Attorney, Agent, or Firm* — Harness, Dickey & Pierce, P.L.C.

(57) ABSTRACT

A color irregularity detecting device includes a spectrometer which includes a dispersing element which disperses light from a measurement target and a light receiving element which receives light from the dispersing element, and a color irregularity detecting section which detects color irregularity, in which the color irregularity detecting device detects color irregularity by comparing measured values (reflectance) which are results of using the spectrometer to measure three measurement wavelengths of light among light from a measurement target region in which a predetermined color is printed on a medium to reference values corresponding to the predetermined color.

18 Claims, 10 Drawing Sheets

(56) References Cited

FOREIGN PATENT DOCUMENTS

| | | |
|---|---|---|
| JP | 2005-043174 A | 2/2005 |
| JP | 2005-195531 A | 7/2005 |
| JP | 2014-206527 A | 10/2014 |

* cited by examiner

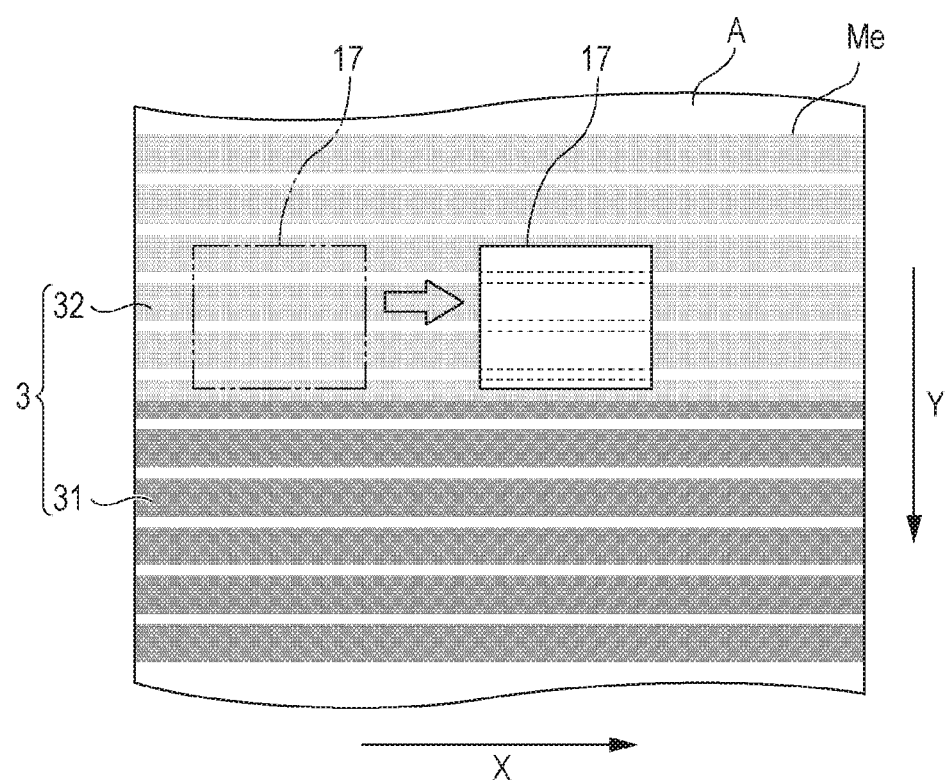

COLOR IRREGULARITY DETECTING DEVICE, IMAGE FORMING APPARATUS, AND COLOR IRREGULARITY DETECTING METHOD

BACKGROUND

1. Technical Field

The present invention relates to a color irregularity detecting device, an image forming apparatus, and a color irregularity detecting method.

2. Related Art

In the related art, a color tone testing method which subjects a surface of a testing target to color tone testing, and an image processing apparatus which carries out the color tone testing method are known (JP-A-2002-286549).

In the image processing apparatus described in JP-A-2002-286549, optical spectral values are detected for points on the surface of the testing target using a spectral sensor (a color measuring device), and color tone data corresponding to the points on the surface of the testing target is calculated using the optical spectral values. The color tone testing of the testing target is carried out using the color tone data.

Incidentally, when printing an image or the like onto a medium, there is a case in which color irregularity occurs in the printed object due to fluctuation in the printing position and the gradation stemming from the apparatus, surface waviness of the medium, or the like. In regard to the color irregularity, in the apparatus described in JP-A-2002-286549, it is possible to detect color irregularity by using the color tone data of the surface of the testing target as described above.

However, since the optical spectrum is acquired for each point in the testing target in order to calculate the color tone data, the measurement time for acquiring the optical spectrum becomes long, and thus, the time necessary for the color tone testing of the color irregularity detection and the like also becomes long.

SUMMARY

An advantage of some aspects of the invention is to provide a color irregularity detecting device, an image forming apparatus, and a color irregularity detecting method which are capable of detecting color irregularity at high speed.

According to an application example of the invention, there is provided a color irregularity detecting device including a spectrometer which includes a dispersing element which disperses light from a measurement target and a light receiving element which receives light from the dispersing element, and a detecting section which detects color irregularity by comparing a measured value which is a result of using the spectrometer to measure a measurement wavelength of light among light from the measurement target of a predetermined color to a reference value corresponding to the predetermined color.

The reference value is a value corresponding to a light quantity value of light of a measurement wavelength included in the light from the measurement target (region) of the predetermined color (when the predetermined color is printed as a desired gradation).

Comparing the measured value to the reference value is not limited to comparing the measured value of the light quantity. For example, this includes comparing the reflectance which is calculated from the measured value of the light quantity to the reflectance corresponding to the reference value.

In this application example, the light quantity of the light of the measurement wavelength (included in the predetermined wavelength range) among the light from the measurement target of the predetermined color (for example, the measurement target region on the medium onto which the predetermined color is printed) is detected, the measured value is compared to the reference value corresponding to the predetermined color, and the color irregularity is detected.

In other words, in this application example, in order to perform the comparison to the reference value, the light corresponding to the measurement wavelength (included in the predetermined wavelength range) is measured and the measured value is acquired. Therefore, in comparison to a case in which the spectral measurement which acquires the optical spectrum of the measurement target (region) is carried out in order to acquire the color tone data of the measurement target (region), it is possible to shorten the measurement time and it is possible to detect the color irregularity at high speed.

In the color irregularity detecting device according to the application example, it is preferable that the detecting section detects that color irregularity is occurring when a difference between the measured value and the reference value is greater than or equal to a predetermined threshold.

In this application example, it is detected that the color irregularity is occurring when the difference between the measured value and the reference value is greater than or equal to a predetermined threshold. In other words, a process of comparing the measured value to the reference value is executed. For example, in comparison to a case in which the color tone data is calculated by acquiring the optical spectrum of the measurement target (region) and the color irregularity is detected using the color tone data, it is possible to reduce the amount of processing target data and the computation amount, and it is possible to suppress an increase in the processing load.

In the color irregularity detecting device according to the application example, it is preferable that the measurement wavelength is included in a predetermined wavelength range, and the predetermined wavelength range is a wavelength range in which a reflectance when the measurement target of the predetermined color is irradiated with light is less than or equal to a predetermined value.

Note that, in this application example, the predetermined wavelength range is a portion of the wavelength range corresponding to the visible region, for example.

Here, the wavelength range in which the reflectance in a predetermined color is less than or equal to a predetermined value is a wavelength range in which the reflectance is low in comparison to other wavelength ranges. For example, this wavelength range is set as at least a portion of the wavelength range corresponding to a reflectance range in a predetermined color in which a lower limit value is the minimum value of the reflectance and the upper limit value is the threshold of the reflectance at which it is possible to detect the color irregularity.

For example, when a predetermined color is printed on the white medium, when the occupation rate (the dot occupation rate) of the printed portion in relation to the pixel area is reduced due to missing dots or the like, the reflectance of the measurement target region increases.

In this application example, as described above, a wavelength included in a predetermined wavelength range in which the reflectance is lesser than in other wavelength ranges and the influence of an increase in the reflectance is easily received is set as the measurement wavelength. Accordingly, in comparison to a case in which the wavelengths included in other wavelength ranges are used as the measurement wavelength, it is possible to increase the difference between the measured value of the measurement wavelength and the reference value, and it is possible to detect the color irregularity with high precision.

In the color irregularity detecting device according to the application example, it is preferable that the detecting section detects color irregularity based on a plurality of the measured values which are results using the spectrometer to measure a plurality of measurement wavelengths of light.

In this application example, the measured values for the plurality of measurement wavelengths included in the predetermined wavelength range are acquired, and the color irregularity is detected based on the measured values. Accordingly, for example, in a case in which the value of the measured value differs from the value corresponding to the actual light quantity value due to the influence of noise or the like, by detecting the color irregularity using a plurality of measured values, it is possible to suppress the occurrence of erroneous detection of color irregularity in comparison to a case in which one measured value is used.

In the color irregularity detecting device according to the application example, it is preferable that the detecting section detects color irregularity based on an average value of the plurality of measured values.

In this application example, the measured values for the plurality of measurement wavelengths included in the predetermined wavelength range are acquired, and the color irregularity is detected based on the average value of the measured values. Accordingly, even when the value of the measured value differs from the value corresponding to the actual light quantity value due to the influence of noise or the like, it is possible to suppress the influence of noise by using the average value of a plurality of measured values. Accordingly, it is possible to suppress the occurrence of erroneous detection, and it is possible to improve the detection sensitivity of the color irregularity.

In the color irregularity detecting device according to the application example, it is preferable that the detecting section detects color irregularity based on a plurality of the measured values which are acquired at each of a plurality of measurement positions.

Note that, in this application example, in order to acquire the measured values at each of the plurality of measurement positions, for example, the measured values may be acquired at each of the plurality of measurement positions which are changed by moving the spectrometer relative to the measurement target (region). The measured values of the plurality of measurement positions may be acquired at the same time using surface dispersion in relation to the region of at least a portion of the measurement target region.

In this application example, the color irregularity is detected based on the measured values corresponding to each of the plurality of measurement positions. Accordingly, it is possible to estimate the occurrence pattern of the region having a different gradation from the desired gradation value (the color irregularity region). For example, when color irregularity regions (striped irregularity) which are the shape of stripes parallel to each other occur, it is possible to estimate the occurrence pattern of the color irregularity regions by calculating the width dimensions of the stripe-shaped color irregularity regions, the occurrence interval of the stripe-shaped color irregularity regions, and the like.

In the color irregularity detecting device according to the application example, it is preferable that the predetermined wavelength range is a wavelength range at which a light reception sensitivity of the light receiving element is greater than or equal to a predetermined value.

Here, the wavelength range in which the light reception sensitivity of the light receiving element is greater than or equal to a predetermined value is a wavelength range in which the light reception sensitivity is great in comparison to other wavelength ranges.

In this application example, it is possible to detect, with high precision, the difference in light quantity between a color irregularity occurrence region and a region in which the color irregularity is not occurring by setting the measurement wavelength, using a wavelength range in which the light reception sensitivity of the light receiving element is greater than for other wavelength regions as the predetermined wavelength range. Therefore, it is possible to improve the detection precision of the color irregularity.

In the color irregularity detecting device according to the application example, it is preferable that the dispersing element is a variable wavelength interference filter.

In this application example, the variable wavelength interference filter (the Fabry-Pérot etalon) is used as a dispersing element. Accordingly, by sequentially changing the dimension of the space between the pair of reflecting surfaces, it is possible to extract light of a plurality of wavelengths in a short time, and it is possible to obtain a shortening in the time necessary for measurement. By using the Fabry-Pérot etalon which has a small size, it is possible to obtain a reduction in the size of the color irregularity detecting device in comparison to a case in which an acousto-optic tunable filter (AOTF), a liquid crystal tunable filter (LCTF) or the like is used.

According to another application example, there is provided an image forming apparatus including the color irregularity detecting device according to the application example described above, and an image forming section which forms an image on a medium.

In this application example, it is possible to obtain the same effects as the color irregularity detecting device of the application example described above.

According to still another application example, there is provided a color irregularity detecting method which detects color irregularity using a spectrometer including a dispersing element which disperses light from a measurement target and a light receiving element which receives light from the dispersing element, the method including acquiring a measured value which is obtained by using the spectrometer to measure a measurement wavelength of light among light from the measurement target of a predetermined color, and detecting color irregularity by comparing the measured value to a reference value corresponding to the predetermined color.

In this application example, it is possible to obtain the same effects as the color irregularity detecting device of the application example described above.

BRIEF DESCRIPTION OF THE DRAWINGS

The invention will be described with reference to the accompanying drawings, wherein like numbers reference like elements.

FIG. 12 is a schematic diagram illustrating another example of a movement direction of a spectrometer during detection of color irregularity.

DESCRIPTION OF EXEMPLARY EMBODIMENTS

First Embodiment

Hereinafter, description will be given of the first embodiment according to the invention based on the drawings. In the present embodiment, hereinafter, as an example of the image forming apparatus of the invention, description will be given of a printer 10 (an ink jet printer) provided with a color irregularity detecting device.

Schematic Configuration of Printer

Figure 1:
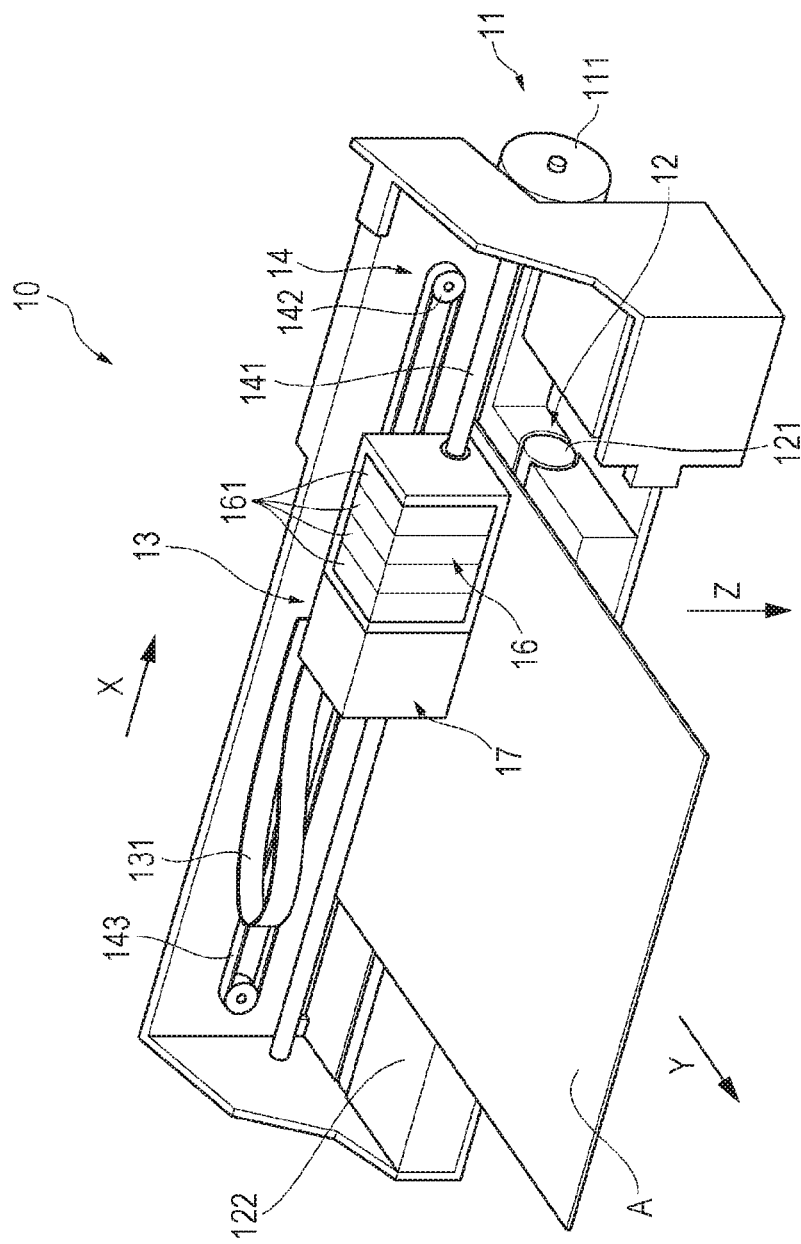
FIG. 1 is an external view illustrating the schematic configuration of a printer of a first embodiment according to the invention.
Figure 2:
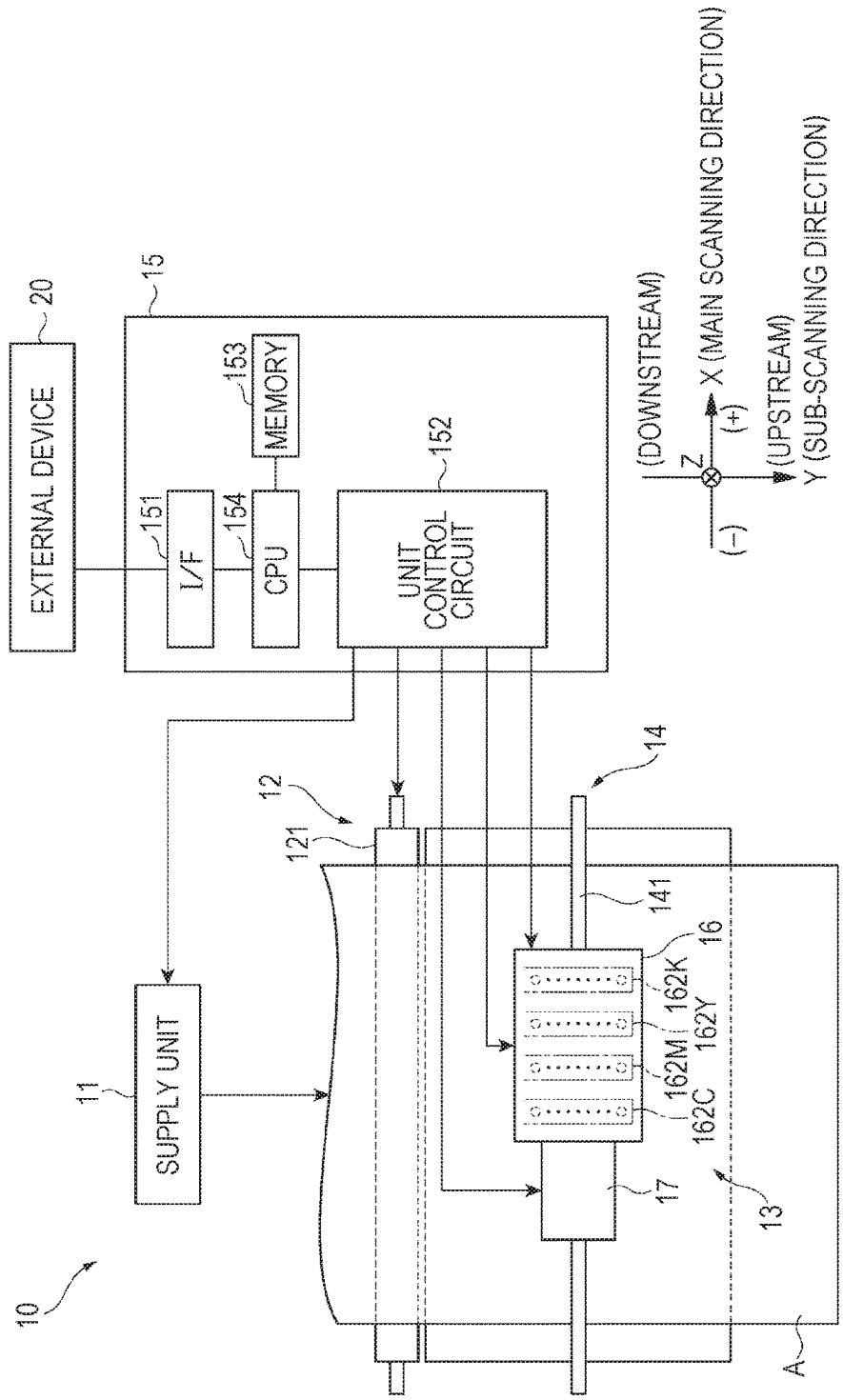
FIG. 2 is a block diagram illustrating the schematic configuration of the printer of the first embodiment.

FIG. 1 is a diagram illustrating a configuration example of the appearance of the printer 10 of the first embodiment. FIG. 2 is a block diagram illustrating the schematic configuration of the printer 10 of the present embodiment.

As illustrated in FIG. 1, the printer 10 is provided with a supply unit 11, a transport unit 12, a carriage 13, a carriage movement unit 14, and a control unit (refer to FIG. 2). The printer 10 controls each of the units 11, 12, and 14, and the carriage 13 based on print data which is input from an external device 20 such as a personal computer, for example, and prints an image onto a medium A. The printer 10 of the present embodiment forms a preset test pattern for detecting color irregularity on the medium A (refer to FIG. 7), measures light quantity values of a predetermined wavelength of the light from the test pattern, and obtains the reflectance. The printer 10 detects color irregularity using the reflectance.

Hereinafter, specific description will be given of the configuration of the printer 10.

The supply unit 11 is a unit which supplies the medium A (exemplified as a white paper surface in the present embodiment) which is an image formation target to an image formation position. For example, the supply unit 11 is provided with a roll body 111 (refer to FIG. 1), a roll drive motor (not shown), and a roll drive wheel train (not shown). The medium A is wound on the roll body 111. The roll drive motor is rotationally driven based on the commands from the control unit 15, and the rotational force of the roll drive motor is transmitted to the roll body 111 via the roll drive wheel train. Accordingly, the roll body 111 rotates and the paper surface which is wound on the roll body 111 is supplied to the downstream side (the +Y direction) in the Y direction (the sub-scanning direction).

Note that, in the present embodiment, an example given in which the paper surface which is wound on the roll body 111 is supplied; however, the invention is not limited thereto. For example, the medium A may be supplied using any supply method, such as supplying the medium A such as a paper surface stacked on a tray or the like one sheet at a time using a roller or the like.

The transport unit 12 transports the medium A which is supplied from the supply unit 11 along the Y direction. In other words, the transport unit 12 is a sub-scan moving unit which causes the carriage 13 to move relative to the medium A in the sub-scanning direction. The transport unit 12 is configured to include a transport roller 121, a driven roller (not shown), and a platen 122. The driven roller is disposed to pinch the medium A between the transport roller 121 and itself and is driven by the transport roller 121.

When the drive force from the transport motor (not shown) is transmitted to the transport roller 121 and the transport motor is driven under the control of the control unit 15, the transport roller 121 is rotationally driven by the rotational force and transports the medium A along the Y direction in a state in which the medium A is interposed between the transport roller 121 and the driven roller. The platen 122 facing the carriage 13 is provided on the downstream side (the +Y side) of the transport roller 121 in the Y direction.

The carriage 13 is provided with a printing section 16 and a spectrometer 17. The printing section 16 prints an image onto the medium A, and the spectrometer 17 performs spectral measurement of a measurement target region Me (refer to FIG. 7) in which a test pattern 3 is formed on the medium A.

The carriage 13 is provided to be capable of moving along the main scanning direction (the X direction) which intersects the Y direction due to the carriage movement unit 14.

The carriage 13 is connected to the control unit 15 via a flexible circuit 131 and carries out the printing process (the image forming process in relation to the medium A) of the printing section 16 and the spectral measurement process of the spectrometer 17 based on the commands from the control unit 15.

Note that, detailed description of the configuration of the carriage 13 will be given later.

The carriage movement unit 14 moves the carriage 13 reciprocally along the X direction (the main scanning direction) based on the commands from the control unit 15. In other words, the carriage movement unit 14 is a main-scan moving unit which causes the carriage 13 to move relative to the medium A in the main scanning direction.

For example, the carriage movement unit 14 is configured to include a carriage guide shaft 141, a carriage motor 142, and a timing belt 143.

The carriage guide shaft 141 is disposed along the X direction and both end portions are fixed to the housing, for example, of the printer 10. The carriage motor 142 drives the timing belt 143. The timing belt 143 is supported to be substantially parallel to the carriage guide shaft 141, and a portion of the carriage 13 is fixed thereto. When the carriage motor 142 is driven based on the commands of the control unit 15, the timing belt 143 travels forward or backward, and the carriage 13 which is fixed to the timing belt 143 is guided by the carriage guide shaft 141 to move reciprocally.

Next, description will be given of the configuration of the printing section 16 and the spectrometer 17 which are provided on the carriage 13 based on the drawings.

Configuration of Printing Section

The printing section 16 forms an image on the medium A by ejecting inks individually onto the medium A in a portion facing the medium A.

In the printing section 16, ink cartridges 161 corresponding to a plurality of colors of ink are mounted in a detachable manner, and inks are supplied from each of the ink cartridges 161 to ink tanks (not shown) via tubes (not shown). A nozzle row (162C, 162M, 162Y, and 162K) including a plurality of nozzles which eject ink droplets and corresponding to each color of cyan C, magenta M, yellow Y, and black K is provided on the bottom surface (a position facing the medium A) of the printing section 16 (refer to FIG. 2). Piezo elements, for example, are disposed in the nozzles, and, by driving the piezo elements, ink droplets supplied from the ink tank are ejected, land on the medium A, and dots are formed. Note that, in the image which is printed in this manner, the occupation rate of the ink dot for each pixel is adjusted according to the gradation value of each pixel.

Configuration of Spectrometer

Figure 3:
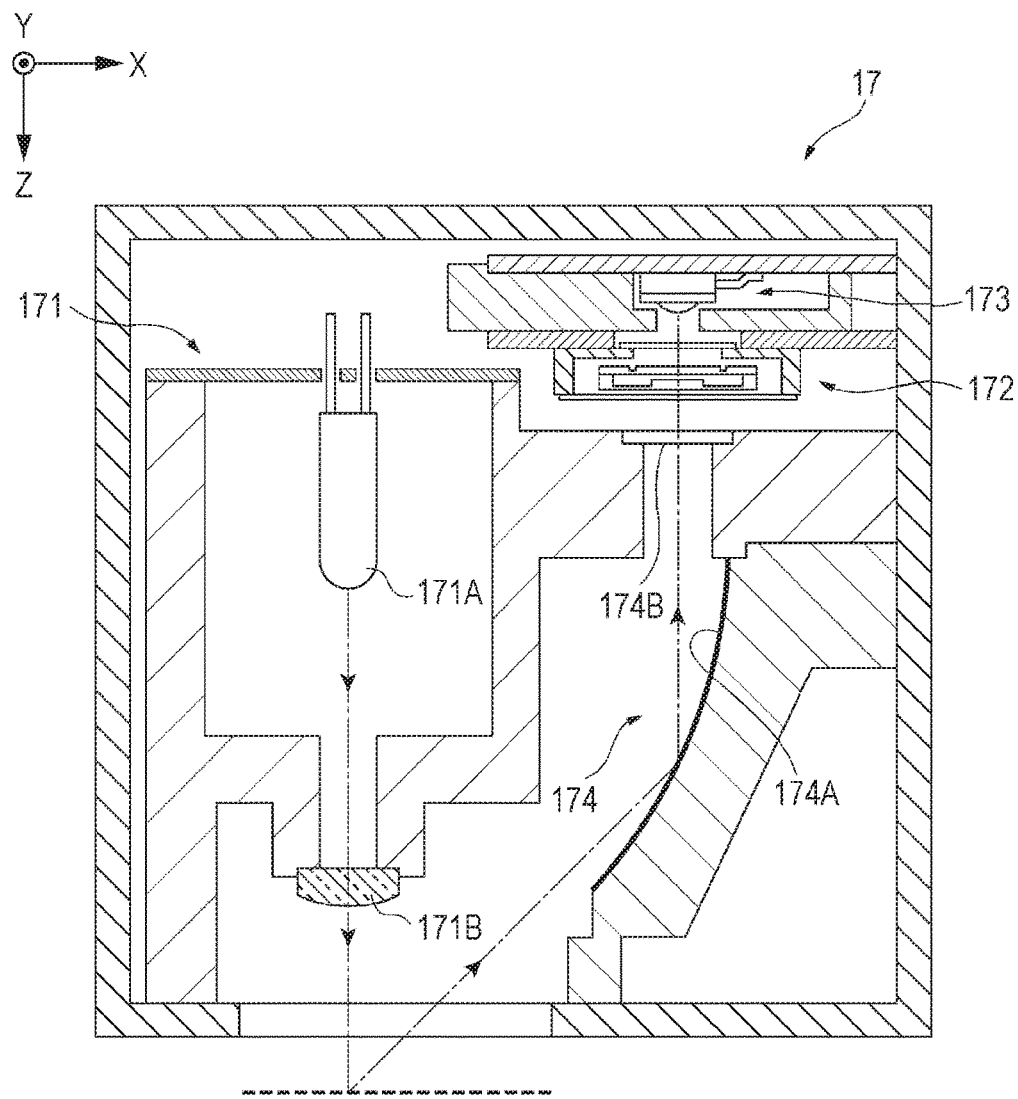
FIG. 3 is a sectional diagram illustrating the schematic configuration of a spectrometer of the first embodiment.

FIG. 3 is a sectional diagram illustrating the schematic configuration of the spectrometer 17.

As illustrated in FIG. 3 in the invention, the spectrometer 17 is provided with a light source section 171, an optical filter device 172, a light receiving section 173, and a light guide section 174. The light receiving section 173 serves as a light receiving element of the invention.

In the spectrometer 17, the medium A is irradiated with irradiation light from the light source section 171, and the light components which are reflected by the medium A are caused to be incident on the optical filter device 172 by the light guide section 174. Light of a predetermined wavelength is allowed to be emitted (transmitted) by the optical filter device 172, and is received by the light receiving section 173. The optical filter device 172 is capable of selecting the transmission wavelength based on the control of the control unit 15, and it is possible to spectrally measure the measurement target region Me on the medium A by measuring the light quantity of the light of each wavelength in visible light.

Configuration of Light Source Section

The light source section 171 is provided with a light source 171A and a condenser section 171B. The light source section 171 irradiates the measurement target region Me of the medium A from the normal direction in relation to the surface of the medium A with the light emitted from the light source 171A.

A light source capable of emitting light of each wavelength in the visible light region is preferable as the light source 171A. For example, it is possible to exemplify a halogen lamp, a xenon lamp, or a white LED as the light source 171A, and, in particular, a white LED which can be easily installed within the limited space within the carriage 13 is preferable. The condenser section 171B is formed of a condenser lens, for example, and concentrates the light from the light source 171A on the measurement target region Me. Note that, in FIG. 3, only one lens (the condenser lens) is displayed in the condenser section 171B; however, the condenser section 171B may be configured by combining a plurality of lenses.

Configuration of Optical Filter Device

Figure 4:
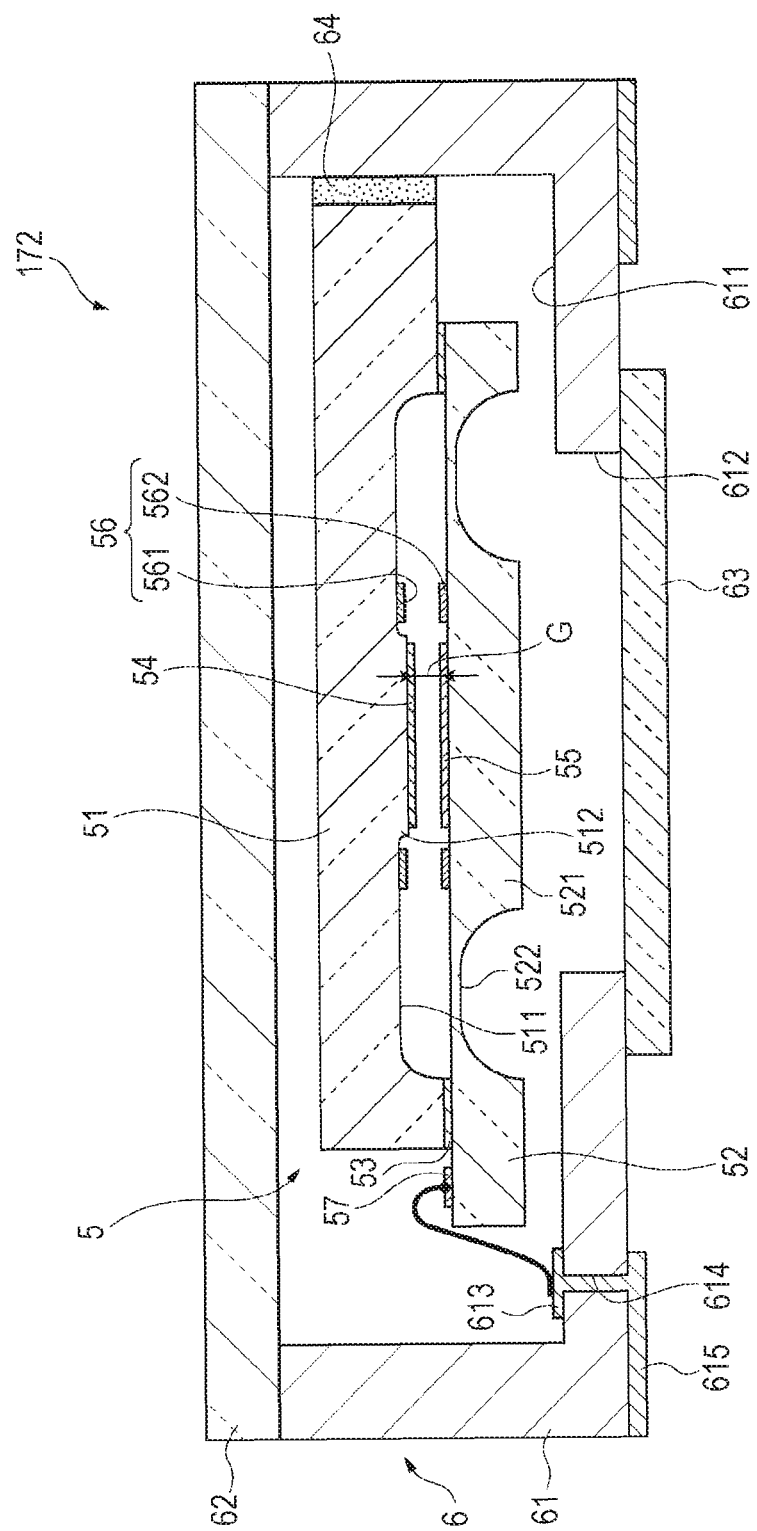
FIG. 4 is a sectional diagram illustrating the schematic configuration of an optical filter device of the first embodiment.

FIG. 4 is a sectional diagram illustrating the schematic configuration of the optical filter device 172.

The optical filter device 172 is provided with a housing 6 and a variable wavelength interference filter 5 (a variable wavelength filter) which is stored on the inner portion of the housing 6.

Configuration of Variable Wavelength Interference Filter

The variable wavelength interference filter 5 is a variable wavelength type Fabry-Pérot etalon device. As illustrated in FIG. 4, the variable wavelength interference filter 5 is provided with a fixed substrate 51 and a movable substrate 52, which are light transmissive and configured integrally by being bonded by a bonding film 53.

The fixed substrate 51 is provided with a first groove portion 511 and a second groove portion 512 which is shallower than the first groove portion 511. The groove portions 511 and 512 are formed by etching. A fixed electrode 561 is provided in the first groove portion 511, and a fixed reflecting film 54 is provided in the second groove portion 512.

The fixed electrode 561 is formed is formed in a ring shape surrounding the second groove portion 512, for example, and faces a movable electrode 562 which is provided on the movable substrate 52.

The fixed reflecting film 54 is formed of, for example, a dielectric multilayer film in which high refraction layers and low refraction layers of metal films such as Ag and alloy films such as Ag alloys are laminated, or, is formed of a laminate in which metal films (alloy films) and dielectric films are laminated.

The movable substrate 52 is provided with a movable portion 521 and a holding portion 522. The holding portion 522 is provided on the outside of the movable portion 521 and holds the movable portion 521.

The movable portion 521 is formed to be greater in the thickness dimension than the holding portion 522. The movable portion 521 is formed to have a greater diameter dimension than that of the outer circumferential edge of the fixed electrode 561, and the movable electrode 562 and a movable reflecting film 55 are provided on the surface of the movable portion 521 facing the fixed substrate 51.

The movable electrode 562 is provided in a position facing the fixed electrode 561.

The movable reflecting film 55 is disposed in a position facing the fixed reflecting film 54 via a gap G. A reflecting film of a similar configuration to the fixed reflecting film 54 described above is used as the movable reflecting film 55.

The holding portion 522 is a diaphragm surrounding the periphery of the movable portion 521 and is formed to be smaller in the thickness dimension than the movable portion 521. The holding portion 522 is more flexible than the movable portion 521, and it becomes possible to displace the movable portion 521 to the fixed substrate 51 side using a minute electrostatic attraction. Accordingly, it becomes possible to change the gap dimension of the gap G in a state in which the degree of parallelism between the fixed reflecting film 54 and the movable reflecting film 55 is maintained.

In the present embodiment, the diaphragm-shaped holding portion 522 is exemplified; however, for example, a configuration may be adopted in which beam-shaped holding portions disposed at an equal-angle interval are provided around a central point on a plane.

A plurality of electrode pads 57 which are individually connected to the fixed electrode 561 and the movable electrode 562 are provided on the outer circumferential portion (a region not facing the fixed substrate 51) of the movable substrate 52.

Configuration of Housing

As illustrated in FIG. 4, the housing 6 is provided with a base 61 and a glass substrate 62. It is possible to use adhesion or the like by low melting point glass bonding using glass frit (low melting point glass), epoxy resin or the like for the base 61 and the glass substrate 62. Accordingly, a storage space is formed on the inner portion, and the variable wavelength interference filter 5 is stored in this storage space.

The base 61 is formed by laminating ceramic onto a thin substrate, for example, and includes a recess portion 611 capable of storing the variable wavelength interference filter 5. The variable wavelength interference filter 5 is fixed to the side surfaces of the recess portion 611 of the base 61 using a fixing material 64.

A light-transmitting through hole 612 is provided in the bottom surface of the recess portion 611 of the base 61. The light-transmitting through hole 612 is provided to include a region which overlaps the reflecting films 54 and of the variable wavelength interference filter 5. A cover glass 63 which covers the light-transmitting through hole 612 is bonded to the surface of the base 61 of the opposite side from the glass substrate 62.

An inside terminal section 613 which is connected to the electrode pads 57 of the variable wavelength interference filter 5 is provided on the base 61, and the inside terminal section 613 is connected to an outside terminal section 615 which is provided on the outside of the base 61 via a conducting hole 614. The outside terminal section 615 is electrically connected to the control unit 15.

Configuration of Light Receiving Section and Light Guide Optical System

Returning to FIG. 3, the light receiving section 173 is disposed over the optical axis of the variable wavelength interference filter 5 and receives the light which is transmitted by the variable wavelength interference filter 5. The light receiving section 173 outputs a detection signal (a current value) according to the received light quantity based on the control of the control unit 15. Note that, the detection signal which is output by the light receiving section 173 is input to the control unit 15 via an I-V converter (not shown), an amplifier (not shown), and an AD converter (not shown).

The light guide section 174 is provided with a reflecting mirror 174A and a band pass filter 174B.

The light guide section 174 reflects the light which is reflected by 45° in relation to the surface of the medium A in the measurement target region Me onto the optical axis of the variable wavelength interference filter 5 using the reflecting mirror 174A. The band pass filter 174B transmits light in the visible regions (for example, 380 nm to 720 nm) and cuts ultraviolet and infrared light. Accordingly, light in the visible regions is incident on the variable wavelength interference filter 5, and the light of a wavelength selected by the variable wavelength interference filter 5 in the visible regions is received in the light receiving section 173.

Configuration of Control Unit

As illustrated in FIG. 2, the control unit 15 is configured to include an I/F 151, a unit control circuit 152, a memory 153, and a central processing unit (CPU) 154.

The I/F 151 inputs the print data which is input thereto from the external device 20 to the CPU 154.

The unit control circuit 152 is provided with a control circuit which controls each of the supply unit 11, the transport unit 12, the printing section 16, the light source 171A, the variable wavelength interference filter 5, the light receiving section 173, and the carriage movement unit 14. The unit control circuit 152 controls the operations of each unit based on command signals from the CPU 154. Note that, the control circuit of each unit may be provided separately from the control unit 15 and be connected to the control unit 15.

The memory 153 stores various programs and various data which control the operations of the printer 10.

Examples of the various data include V-λ data indicating the wavelength of light which is transmitted by the variable wavelength interference filter 5 in relation to the voltage applied to an electrostatic actuator 56 when controlling the variable wavelength interference filter 5, print program file data which stores each ink ejection amount in relation to the color data included as print data, and the like.

Note that, the light emission properties (the emission spectrum) of the light source 171A in relation to each wavelength, the light receiving properties (the reception photo-sensitivity properties) of the light receiving section 173 in relation to each wavelength, and the like may also be stored.

Figure 5:
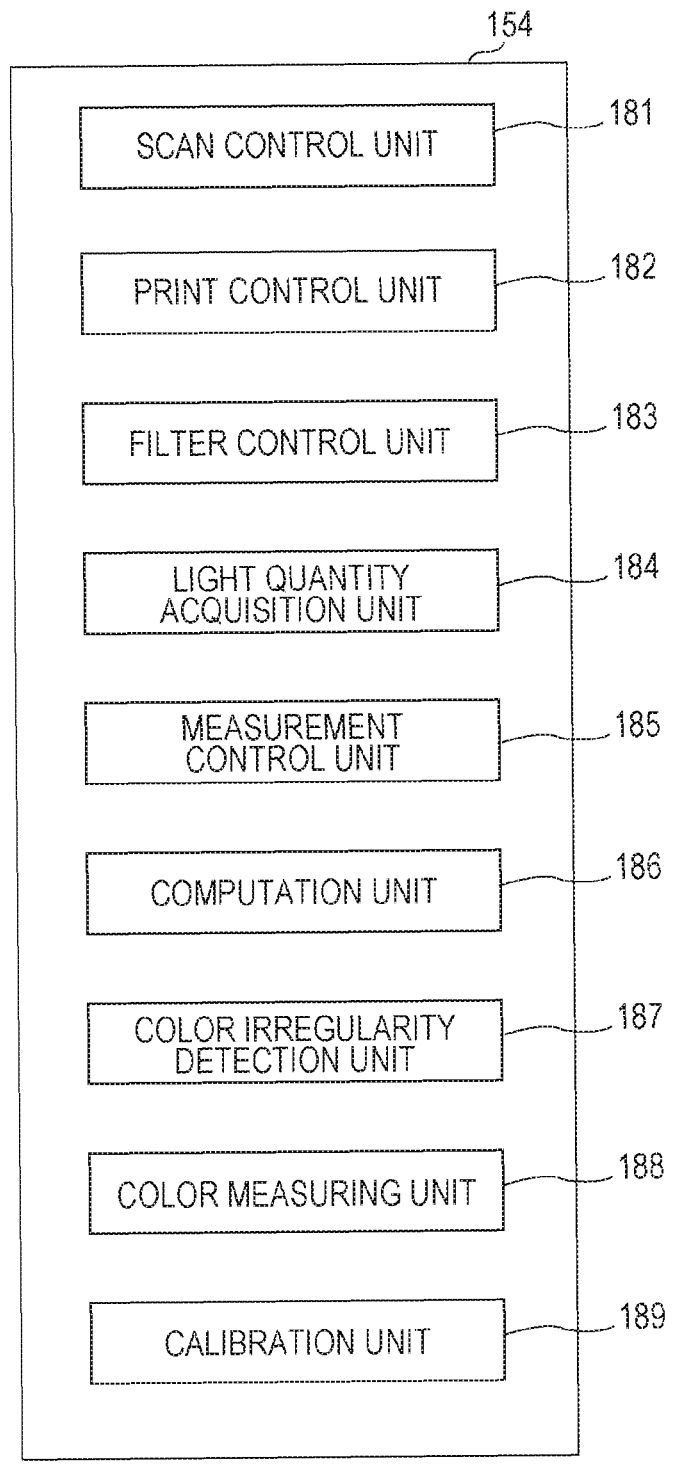
FIG. 5 is a block diagram illustrating the configuration of each function of a control unit in the first embodiment.

FIG. 5 is a block diagram illustrating the functional configuration of the CPU 154 included in the control unit 15 of the printer 10.

As illustrated in FIG. 5, by reading and executing various programs stored in the memory 153, the CPU 154 functions as a scan control unit 181, a print control unit 182, a filter control unit 183, a light quantity acquisition unit 184, a measurement control unit 185, a computation unit 186, a color irregularity detection unit 187 corresponding to a detecting section of the invention, a color measuring unit 188, a calibration unit 189, and the like.

The scan control unit 181 outputs a command signal to the unit control circuit 152 instructing the driving of the supply unit 11, the transport unit 12, and the carriage movement unit 14. Accordingly, the unit control circuit 152 supplies the medium A to the transport unit 12 by driving the roll drive motor of the supply unit 11. The unit control circuit 152 drives the transport motor of the transport unit 12 to transport a predetermined region of the medium A along the Y direction to a position at which the region faces the carriage 13 of the platen 122. The unit control circuit 152 drives the carriage motor 142 of the carriage movement unit 14 to move the carriage 13 along the X direction.

The print control unit 182 outputs a command signal to the unit control circuit 152 instructing the control of the printing section 16 based on the print data which is input from the external device 20, for example.

In the present embodiment, the print control unit 182 forms the test pattern 3 on the medium A based on the print data for forming the test pattern 3. Note that, the print data may be stored in the memory 153, and may be input from the external device 20. Note that, although detailed description will be given later, the test pattern 3 includes a color region formed by a predetermined color (a predetermined gradation) such as blue or red being printed in a predetermined region on the medium A.

When the command signal is output from the print control unit 182 to the unit control circuit 152, the unit control circuit 152 outputs a print control signal to the printing section 16, and ejects ink onto the medium A by driving the piezo elements provided in the nozzles such that the dot occupation rate of each color in each pixel becomes a value corresponding to the print control signal. Note that, when carrying out the printing, a dot forming operation in which the carriage 13 moves along the X direction and dots are formed by causing the ink to be ejected from the printing section 16 during the movement, and a transport operation in which the medium A is transported in the Y direction are repeated alternately, and an image formed of a plurality of dots is printed onto the medium A.

The filter control unit 183 reads a drive voltage to the electrostatic actuator 56 corresponding to the wavelength of light that the variable wavelength interference filter 5 is to be allowed to transmit from the V-λ data of the memory 153 and outputs a command signal to the unit control circuit 152. Accordingly, the unit control circuit 152 applies the drive voltage which is provided to the variable wavelength interference filter 5 as a command, and light of a predetermined transmission wavelength is transmitted by the variable wavelength interference filter 5.

The filter control unit 183 outputs a command signal corresponding to the measurement wavelength based on the measurement conditions set by the measurement control unit 185 (described later), and switches the voltage which is applied to the electrostatic actuator 56.

The light quantity acquisition unit 184 acquires the light quantity of the light which is transmitted by the variable wavelength interference filter 5 based on the detection signal which is output by the light receiving section 173.

The measurement control unit 185 sets the measurement conditions in which the measurement positions at which to measure the light quantity for detecting color irregularity are associated with the measurement wavelengths in the measurement positions. In the present embodiment, although detailed description will be given later, a plurality of measurement wavelengths are set for each measurement position. The measurement wavelengths are wavelengths corresponding to the colors which are printed as the test pattern 3. The measurement conditions may be stored in the memory 153 in the same manner as the print data of the test pattern 3, may be input from the external device 20, and may be set, as appropriate, according to the colors of the test pattern 3.

Note that, the scan control unit 181 sets the measurement positions of the spectrometer 17 based on the measurement conditions which are set by the measurement control unit 185. The filter control unit 183 causes the variable wavelength interference filter 5 to transmit light of the measurement wavelength corresponding to the measurement position on the medium A.

The computation unit 186 calculates the average value of the reflectance from the measured values corresponding to the light quantity values of the plurality of measurement wavelengths for each measurement position. In the present embodiment, the calculated average values are used as the measured values at each measurement position.

The color irregularity detection unit 187 detects the color irregularity using the measured value at each measurement position. The color irregularity detection detects the occurrence of color irregularity when the difference between a reference value of the reflectance which is stored in advance and the measured value of the reflectance is greater than or equal to a predetermined value. Note that, the measurement positions corresponding to the measured values are included in a region having a different value from a predetermined gradation value (that is, a color irregularity region).

When the spectral measurement is carried out using the spectrometer 17, the color measuring unit 188 measures the chromaticity of a measurement target based on the spectral measurement results. Note that, the wavelength region which is the measurement target during the color measurement is a visible light region from 400 nm to 700 nm, for example, and the color measurement is carried out based on the light quantities of the light of 16 wavelengths with a 20 nm interval, using 700 nm as the initial wavelength.

The calibration unit 189 corrects (updates), as appropriate, the print profile data using the color measurement results by the color measuring unit 188 of a correction test pattern, a white reference, or the like.

Note that, detailed description will be given later of the operations of the functional configuration of the control unit 15.

Color Irregularity Detecting Method

Next, the color irregularity detecting method which is carried out in the printer 10 of the present embodiment will be described based on the drawings.

In the color irregularity detecting method of the printer 10, the printer 10 prints a test pattern for detecting color irregularity while transporting the medium A in the Y direction. Subsequently, the printer 10 transports the medium A in the −Y direction, measures the reflectance at a plurality of measurement positions along the Y direction, and detects color irregularity based on the measurement results. In the present embodiment, the light quantity is measured at each of the plurality of measurement positions along the Y direction for a predetermined plurality of wavelengths (for example, three wavelengths). The color irregularity is detected by comparing the measurement results (the reflectance) for each measurement position and the reference values.

Note that, in the present embodiment, before the detection of color irregularity, the printer 10 carries out the white correction using the calibration unit 189 based on the color measurement results of a white reference object acquired by the color measuring unit 188.

Figure 6:
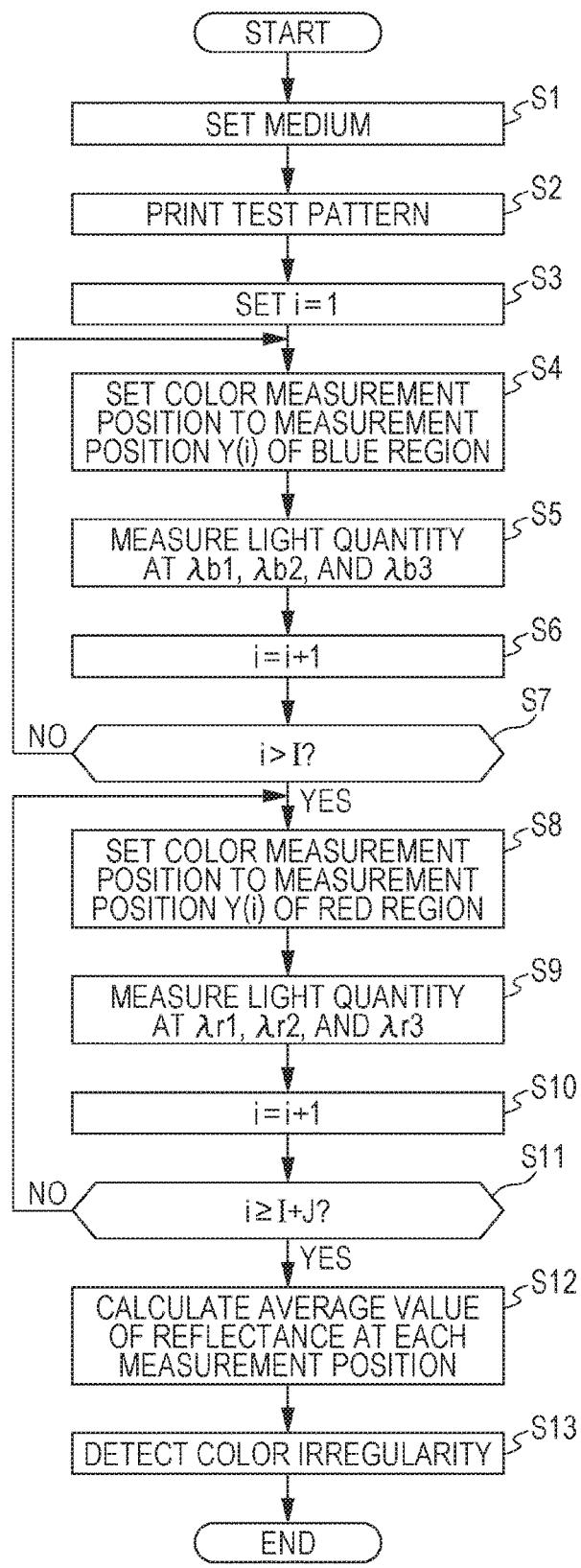
FIG. 6 is a flowchart illustrating a color irregularity detecting method in the first embodiment.

FIG. 6 is a flowchart illustrating the color irregularity detecting method in the printer 10.

Test Pattern Formation

In the color irregularity detecting method of the printer 10, the test pattern for detecting color irregularity is printed on the medium A.

The scan control unit 181 sets the medium A in a predetermined position (step S1). In other words, the scan control unit 181 controls the supply unit 11 and the transport unit 12 to transport the medium A in the sub-scanning direction (the +Y direction), and a predetermined print starting position of the medium A is set on the platen 122. The scan control unit 181 moves the carriage 13 to an initial position (for example, the −X side end portion in the main scanning direction).

Subsequently, the print control unit 182 reads the print data of the test pattern for color irregularity detection from the memory 153 and prints the test pattern onto the medium A in synchronization with the control of the scan control unit 181 (step S2).

In other words, the scan control unit 181 causes the carriage 13 to scan at a fixed speed to the +X side, for example. The print control unit 182 identifies the position of the printing section 16 of the carriage 13 according to the time from the start of the scanning, for example, and forms an image by ejecting an amount of ink corresponding to the gradation values from nozzles of predetermined colors onto predetermined positions based on the print data for the test pattern (an image forming operation). When the carriage 13 moves to the +X side end portion, the scan control unit 181 controls the supply unit 11 and the transport unit 12 to transport the medium A in the +Y direction (a transport operation). The scan control unit 181 causes the carriage 13 to scan in the −X direction, and the print control unit 182 forms an image having the colors and gradation values based on the print data.

The test pattern is formed on the medium A by repeating the image forming operation and the transport operation described above.

Figure 7:
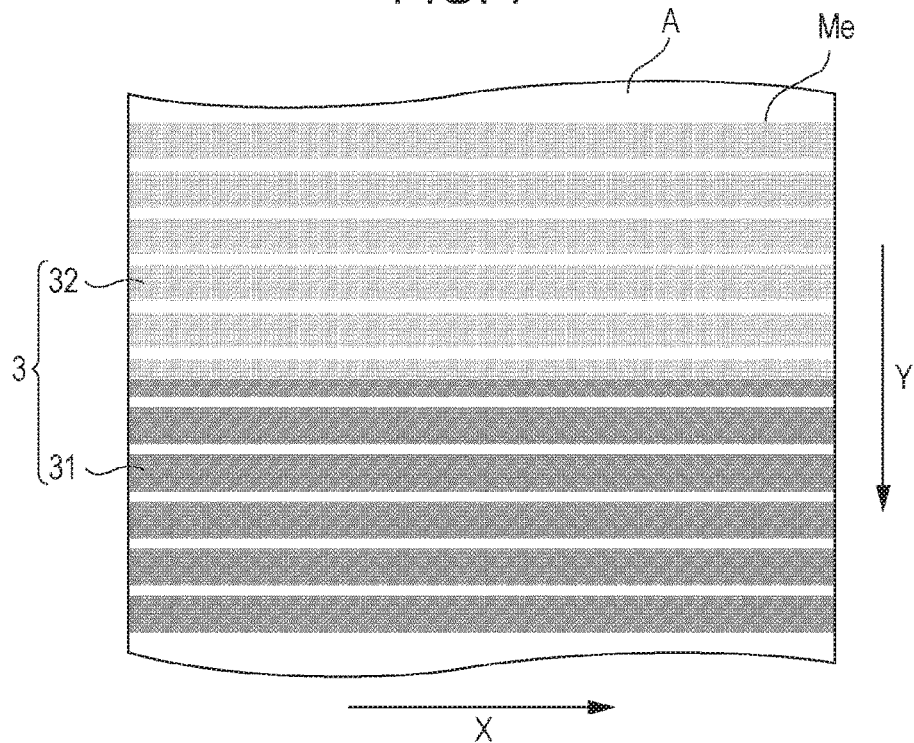
FIG. 7 is a schematic diagram illustrating a test pattern in the first embodiment.

FIG. 7 is a diagram illustrating an example of a test pattern which is formed in the present embodiment.

As illustrated in FIG. 7, in the present embodiment, the test pattern 3 includes a measurement target region Me including a blue region 31 and a red region 32. The regions 31 and 32 are adjacent along the Y direction.

The blue region 31 is a band-shaped region and is formed by ink of the colors cyan C and magenta M being ejected from the nozzle rows 162C and 162M of the printing section 16.

The red region 32 has a similar shape and is positioned on the −Y side of the blue region 31. The red region 32 is formed by ink of the colors magenta M and yellow Y being ejected from the nozzle rows 162M and 162Y of the printing section 16.

Note that, FIG. 7 schematically illustrates the test pattern 3 which has stripe-shaped color irregularity (striped irregularity) in which the gradation changes along the Y direction. Such striped irregularity occurs due to, for example, a difference in the ejection amount between each nozzle of the ink jet head, irregularities in the tension acting on the medium A during the transporting, waviness of the medium A caused by cockling or the like of the medium A, and the like.

Measurement Positions

Figure 8:
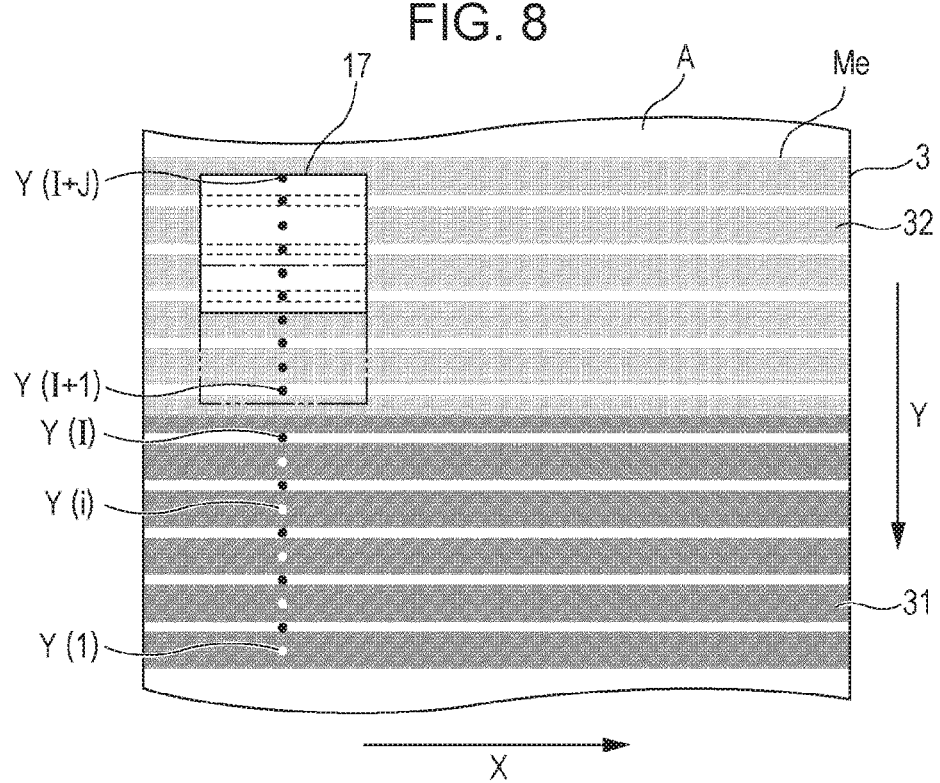
FIG. 8 is a schematic diagram illustrating measurement positions in the first embodiment.

FIG. 8 is a schematic diagram illustrating measurement positions Y(i) in relation to the test pattern 3.

As illustrated in FIG. 8, the printer 10 measures the reflectance of the test pattern 3 in a plurality of measurement positions Y(1) to Y(I+J) along the Y direction.

Note that, the measurement positions Y(1) to Y(I) are measurement positions in the blue region 31, and the measurement positions Y(I+1) to Y(I+J) are measurement positions in the red region 32. The measurement positions Y(1) to Y(I+J) are set from the +Y side to the −Y side.

Each measurement position may be preset in relation to the test pattern 3 and stored in the memory 153, and may also be set, as appropriate, by the measurement control unit 185.

For example, each of the measurement positions Y(i) (i=1 to I+J) may be set separated by a predetermined interval in the Y direction, and may be set such that the interval gradually changes along the Y direction.

Measurement Wavelengths

Figure 9:
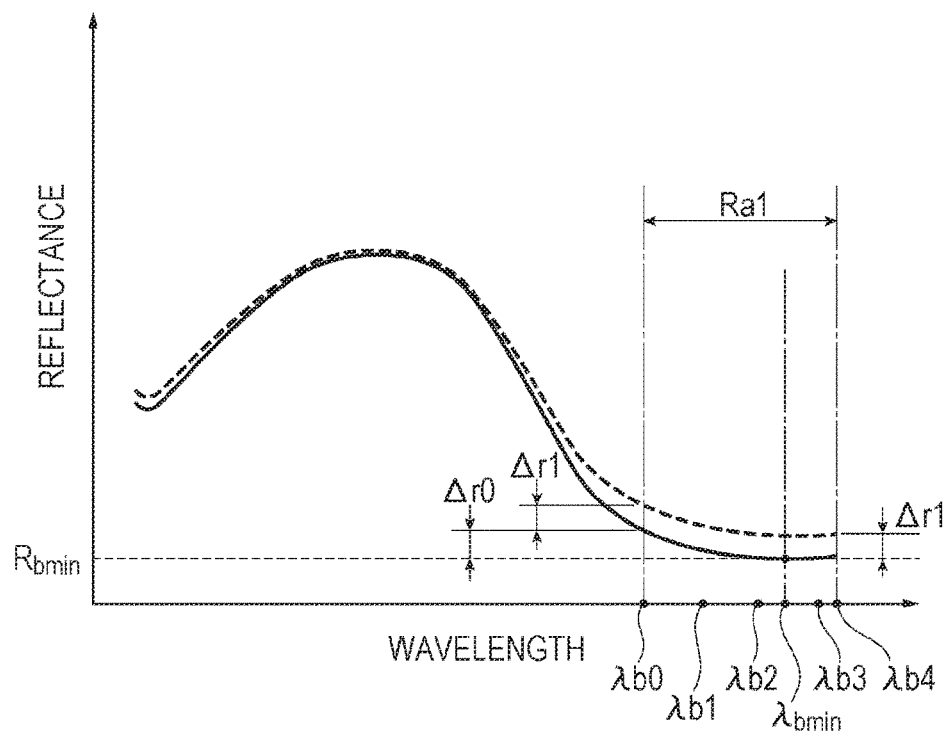
FIG. 9 is a schematic diagram illustrating measurement wavelengths in the first embodiment.

FIG. 9 is a diagram schematically illustrating the relationship between the wavelength and the reflectance in the blue region 31.

In FIG. 9, the solid line indicates the reflectance when printing is performed at the appropriate gradation values, that is, indicates the reference values. Meanwhile, when the dot occupation rate in the pixels falls due to ejecting irregularity of the ink and waviness or the like of the medium A, the occupation rate of the exposed portion of the white medium A increases, and, as a result, the reflectance increases as indicated by the broken line in FIG. 9 and so-called whitening occurs. A region in which this whitening exceeds an allowable value is also referred to as a color irregularity region.

The influence of the whitening described above is conspicuous at a wavelength at which there is a greater difference from the reflectance of the white portions of the medium A, that is, at a wavelength at which the reflectance is smaller.

Therefore, as illustrated in FIG. 9, in the blue region 31, a plurality of wavelengths included in a predetermined wavelength range Ra1 (for example, a wavelength range from 580 nm to 700 nm) on the long wavelength side at which the reflectance is less than or equal to the predetermined value and the influence of the whitening is comparatively great are set as the measurement wavelengths. In the present embodiment, for example, three wavelengths $\lambda b1$, $\lambda b2$, and $\lambda b3$ are set as the measurement wavelengths.

The predetermined wavelength range Ra1 in which the measurement target wavelengths are included is, for example, the wavelength range Ra1 (from $\lambda b0$ to $\lambda b4$) in which the reflectance difference is less than or equal to a predetermined value $\Delta r0$ in relation to a reflectance minimum value $R_{bmin}$ (a wavelength $\lambda_{bmin}$) in a region which is printed using the appropriate gradation values (an appropriate region). The predetermined value $\Delta r0$ may be set such that it is possible to detect a difference $\Delta r1$ between the reflectance in the color irregularity region and the reflectance corresponding to the appropriate region.

A range in which the difference between the reflectance and the reflectance of the surface of the medium A (in the present embodiment, the reflectance is approximately 100%) is a predetermined value or greater may be set as the predetermined wavelength range Ra1.

Figure 10:
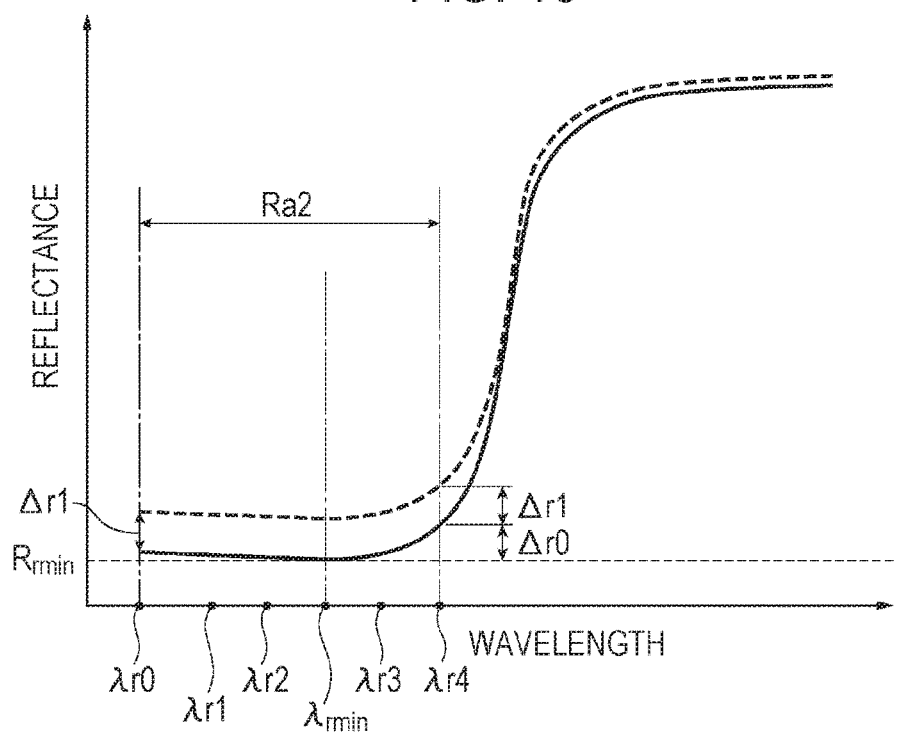
FIG. 10 is a schematic diagram illustrating measurement wavelengths in the first embodiment.

FIG. 10 is a diagram schematically illustrating the relationship between the wavelength and the reflectance in the red region 32. In FIG. 10, the properties of the reflectance as the reference value are indicated with a solid line, and the properties of the color irregularity region are indicated with a broken line.

In the same manner, in the red region 32, a plurality of wavelengths included in a wavelength range Ra2 (for example, a wavelength range from 400 nm to 560 nm) of the short wavelength of the short wavelength side at which the influence of whitening is comparatively great is set as the measurement wavelengths. In the present embodiment, for example, the three wavelengths $\lambda r1$, $\lambda r2$, and $\lambda r3$ are set as the measurement wavelengths.

Note that, in the red region 32, for the predetermined wavelength range Ra2, the wavelength range Ra2 (from $\lambda b0$ to $\lambda b4$) in which the reflectance difference from the minimum value $R_{rmin}$ (the wavelength $\lambda_{rmin}$) of the reflectance is less than or equal to the predetermined value $\Delta r0$ is set as the wavelength range at which the reflectance is less than or equal to a predetermined value. It is possible to detect the difference $\Delta r1$ between the reflectance in the color irregularity region and the reference value corresponding to the appropriate region.

Color Irregularity Detection

Returning to FIG. 6, after step S2, the light quantity of the measurement wavelengths is measured for each measurement position Y(i) (i=1 to I+J) which is set in relation to the test pattern 3 described above.

First, the measurement control unit 185 sets a variable i to 1 (step S3). Accordingly, the measurement position is initialized to Y(1).

Next, the scan control unit 181 moves the carriage along the X direction or transports the medium A, and sets the color measurement position of the spectrometer 17 to the measurement position Y(1) on the blue region 31 of the test pattern 3 (step S4).

The light quantity is measured for the three measurement wavelengths λb1, λb2, and λb3 which are set in relation to the blue region 31 (step S5).

In other words, the filter control unit 183 sets the gap dimension of the variable wavelength interference filter 5 to a value corresponding to the measurement wavelength. The light quantity acquisition unit 184 acquires the light quantity values of the light transmitted at the measurement wavelengths.

Once the light quantity measurement at the set measurement positions is completed, the measurement control unit 185 increments the variable i by 1 to update the variable i (step S6) and determines whether or not the post-update variable i is greater than I (step S7).

When the variable i is determined to be less than or equal to I in step S7 (no in step S7), the process returns to step S4, the medium A is transported in the −Y direction, the color measurement position of the spectrometer 17 is set to the post-update measurement position Y(i), and the processes of steps S5 to S7 are executed.

Meanwhile, when the variable i is greater than I in step S7, that is, when i is determined to be greater than or equal to I+1 (yes in step S7), in the same manner as in step S4, the medium A is transported in the −Y direction, and the color measurement position of the spectrometer 17 is set to the measurement position Y(I+1) which is positioned in the red region 32 (step S8). The measurement positions Y(I+1) to Y(I+J) which are set in step 8 are positioned in the red region 32.

Next, the light quantity is measured for the three measurement wavelengths λr1, λr2, and λr3 which are set in relation to the red region 32 to acquire the measurement result (step S9).

Once the light quantity measurement at the set measurement positions is completed, the measurement control unit 185 increments the variable i by 1 to update the variable i (step S10) and determines whether or not the post-update variable i is greater than I+J (step S11).

The processes of steps S8 to S11 are executed until the variable i is determined to be greater than or equal to I+J in strep S11, that is, until the light quantity measurement is completed for all of the measurement positions Y(i).

Meanwhile, when the variable i is determined to be greater than or equal to I+J in step S11 (yes in step S11), the computation unit 186 calculates the average value of the reflectance for the measurement positions Y(i) using the light quantity measurement results (step S12).

In other words, the computation unit 186 calculates the reflectance of each measurement wavelength using the light quantity value which is acquired for each of the three measurement wavelengths in the measurement position Y(i) and calculates the average value of the reflectance.

The color irregularity detection unit 187 detects the color irregularity using the average values of the reflectance at each measurement position Y(i) as the measured values (step S13).

For example, when the difference value Δr1 between the average value of the reflectance at each measurement position Y(i) (i=1 to I) which are positioned in the blue region 31 and the reference values in the blue region 31 is greater than or equal to a predetermined threshold, the occurrence of color irregularity is detected. The threshold is an upper limit value of an allowable range of color irregularity as difference values of the reflectance.

Note that, the reference value which are the comparison target for the average values of the reflectance are average values of the reflectance at the measurement wavelengths λb1, λb2, and λb3 in the blue region 31, are calculated in advance, and are stored in the memory 153.

In the same manner for the measurement positions Y(i) (i=I+1 to J) which are positioned in the red region 32, the average value of the reflectance at each measurement position is compared to the reference value in the red region 32 and the occurrence of color irregularity is detected. In the same manner, the reference values relating to the red region 32 are the average values of the reference values of each reflectance at the measurement wavelengths λr1, λr2, and λr3 in the red region 32, are calculated in advance, and are stored in the memory 153.

When the coordinates of the measurement positions at which color irregularity is detected are stored in the memory 153 by the color irregularity detection unit 187, the process of the present flowchart is completed.

Note that, in the printer 10, various adjustments such as the adjustment of the ink ejection amount of each nozzle, the adjustment of the ink ejection amount between nozzle rows, and the adjustment of the ink ejection timing are carried out based on the coordinates of the positions at which color irregularity is detected to have occurred.

Operation Effects of First Embodiment

In the present embodiment, of the light from the measurement target region Me on the medium A onto which predetermined colors are printed, the light quantity of the light of the measurement wavelengths in a predetermined wavelength range is detected, and color irregularity is detected by comparing the reflectance (the measured value) detected from the light quantity value with the reference value of the reflectance. Therefore, in comparison to a case in which the spectral measurement is carried out on the entire measurement target region Me in order to calculate the color tone data of the measurement target region Me, it is possible to reduce the number of measurements, and, it is possible to reduce the measurement area. Accordingly, it is possible to shorten the measurement time, and it is possible to detect the color irregularity at high speed.

Color irregularity is detected when the reflectance which is a measured value is compared with a reference value and the difference therebetween is greater than or equal to a predetermined threshold. Therefore, for example, in comparison to a case in which the color tone data is calculated by acquiring the optical spectrum of the measurement target region Me and the color irregularity is detected using the color tone data, it is possible to reduce the amount of processing target data and the computation amount, and it is possible to suppress an increase in the processing load.

Here, when a predetermined color is printed on the white medium A, when the occupation rate of the printed portion in relation to the pixel area is reduced due to missing dots or the like, whitening in which the reflectance of the measurement target region Me increases occurs.

In the present embodiment, as described above, the measurement wavelengths are selected from a wavelength range which has a lesser reflectance than other wavelength ranges and is easily influenced by an increase in the reflectance due to whitening. Accordingly, in comparison to a case in which the wavelengths included in other wavelength ranges are used as the measurement wavelengths, it is possible to increase the difference between the reflectance at the measurement wavelengths in the color irregularity region and the reference value, and it is possible to detect the color irregularity with high precision.

In the present embodiment, the reflectance is acquired at a plurality of measurement wavelengths included in the predetermined wavelength range, and the color irregularity is detected based on the plurality of reflectances. Accordingly, for example, in a case in which the measured light quantity value differs from the actual light quantity value due to the influence of noise or the like, by measuring the light quantity values corresponding to a plurality of measurement wavelengths and detecting the color irregularity based on the measurement results, it is possible to suppress the occurrence of erroneous detection of color irregularity in comparison to a case in which one measured value is used.

In the present embodiment, the reflectance is acquired at a plurality of measurement wavelengths, and the color irregularity is detected based on the average value of the reflectances. Accordingly, even when the measured light quantity value differs from the actual light quantity value due to the influence of noise or the like, it is possible to suppress the influence of noise by using the average value of a plurality of measured values. Accordingly, it is possible to suppress the occurrence of erroneous detection of color irregularity, and it is possible to improve the detection sensitivity of the color irregularity.

In the present embodiment, the color irregularity is detected based on the measured values corresponding to each of the plurality of measurement positions Y(i). Accordingly, when a plurality of color irregularity regions which are the shape of stripes parallel to the X direction is generated along the Y direction (striped irregularity), it is possible to estimate the striped irregularity pattern.

In the present embodiment, the variable wavelength interference filter 5 is used as a dispersing element. Accordingly, by sequentially changing the gap G between the pair of reflecting films 54 and 55, it is possible to extract light of a plurality of wavelengths in a short time, and it is possible to obtain a shortening in the time necessary for measurement. By using the Fabry-Pérot etalon which has a small size, it is possible to obtain a reduction in the size of the color irregularity detecting device in comparison to a case in which an acousto-optic tunable filter (AOTF), a liquid crystal tunable filter (LCTF) or the like is used.

Second Embodiment

Next, description will be given of the second embodiment according to the invention. Note that, in the following description, aspects of the configuration and processes which are the same as those of the first embodiment will be assigned the same reference symbols, and description thereof will be omitted or simplified.

In the first embodiment described above, an example is given in which a wavelength region which has a low reflectance including wavelengths at which the reflectance is least in the test pattern is used as the predetermined wavelength region. In contrast, the second embodiment differs from the first embodiment in that a wavelength region in which the light reception sensitivity of the light receiving section 173 has high sensitivity of a predetermined value or greater is used as the predetermined wavelength region. The second embodiment also differs from the first embodiment in that a green region is included as the test pattern.

Light Quantity Measurement of Green Region

Figure 11A:
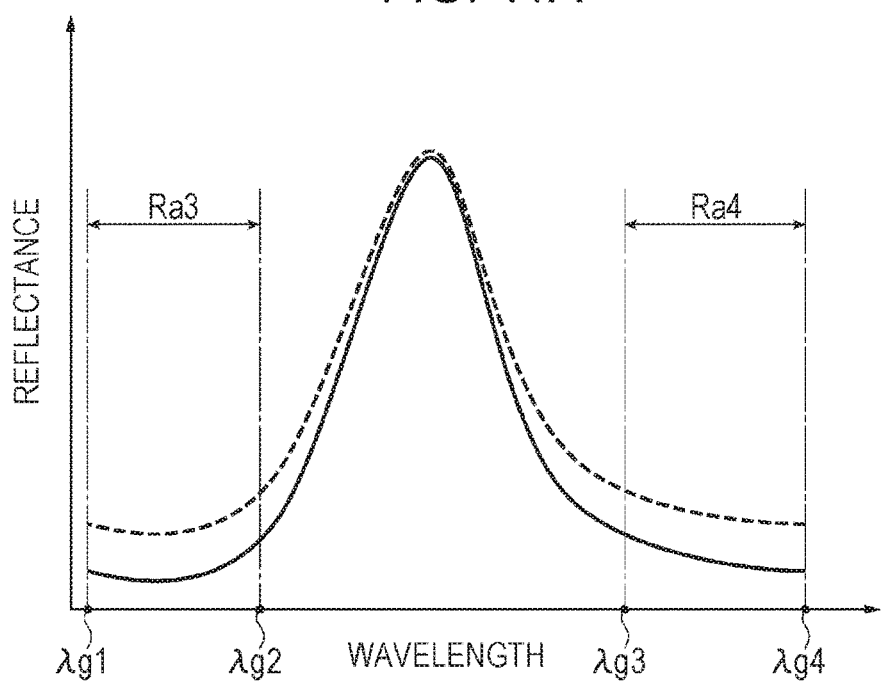
FIGS. 11A and 11B are schematic diagrams illustrating measurement wavelengths in a second embodiment.
Figure 11B:
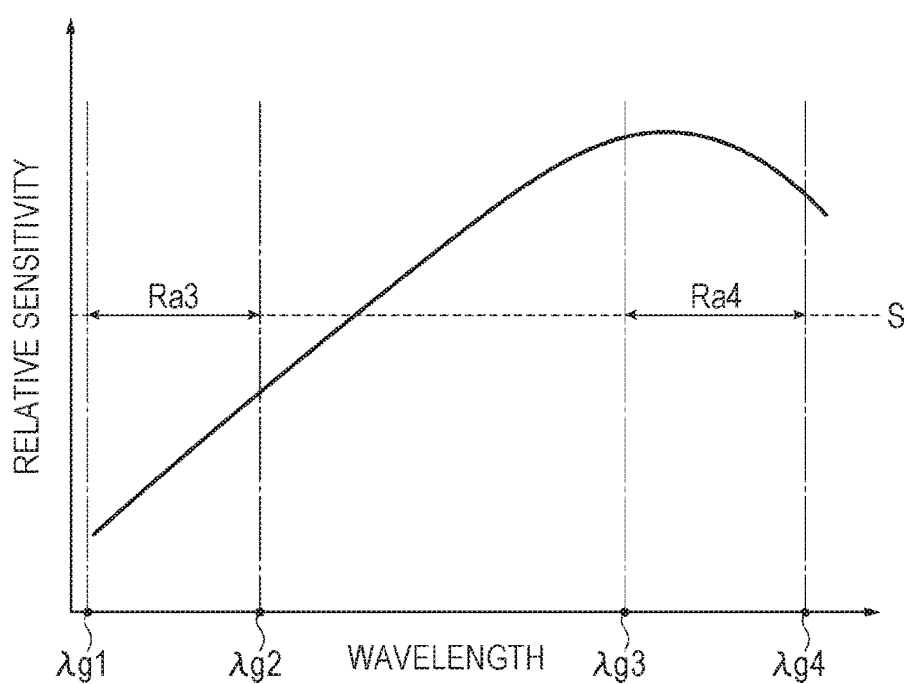

FIG. 11A schematically illustrates the relationship between the wavelength and the reflectance in the green region, and FIG. 11B schematically illustrates an example of the light reception sensitivity properties of the light receiving section 173.

Note that, in FIG. 11A, the solid line indicates the reflectance (the reference value) when printing is performed at the appropriate gradation values, and the broken line indicates the reflectance in the color irregularity region.

The green region is formed from one end to the other end in the X direction of the medium A across a predetermined width in the Y direction by ink of the colors cyan C and yellow Y being ejected from the nozzle rows 162C and 162Y of the printing section 16.

As illustrated in FIG. 11A, for the green region, it is possible to set two ranges as the predetermined wavelength range with low reflectance, a first range Ra3 ($\lambda g1$ to $\lambda g2$) of the short wavelength side, and a second range Ra4 ($\lambda g3$ to $\lambda g4$) of the long wavelength side.

Of these two wavelength ranges Ra3 and Ra4, as illustrated in FIG. 11B, the first range Ra3 is a wavelength region in which the light reception sensitivity of the light receiving section 173 is less than or equal to a predetermined value s. Meanwhile, the second range Ra4 is a wavelength region in which the light reception sensitivity of the light receiving section 173 is greater than or equal to the predetermined value s.

In the present embodiment, of the wavelength ranges Ra3 and Ra4, the second range Ra4 which is a wavelength region in which the light reception sensitivity is a high sensitivity greater than or equal to the predetermined value s is set as the predetermined wavelength range based on the sensitivity properties of the light receiving section 173. The measurement wavelengths are set from the second range Ra4.

Operation Effects of Second Embodiment

In the present embodiment, it is possible to detect, with high precision, the difference in received light quantity between values of a color irregularity occurrence region and an appropriate region by setting a wavelength range in which the light reception sensitivity of the light receiving section 173 is greater than for other wavelength regions as the predetermined wavelength range. Therefore, it is possible to improve the detection precision of the color irregularity.

Modification Example

Note that, the invention is not limited to the embodiments described above, and configurations obtained by modification, improvement, combination, as appropriate, of the embodiments, and the like within a range in which it is possible to achieve an aspect of the invention are included in the invention.

In the embodiments described above, a configuration is exemplified in which the predetermined wavelength range is a wavelength range in which the reflectance in the color regions 31 and 32 which are printed as the test pattern 3 is less than or equal to a predetermined value, and the measurement wavelengths are selected from a wavelength range in which the influence of whitening when printing on the white medium A is great; however, the invention is not limited thereto.

For example, for the measurement wavelengths, a wavelength at which the variation in reflectance corresponding to the variation in the dot occupation rate (that is, color irregularity) in relation to the reflectance of the medium surface is greatest for a predetermined color which is printed in the test pattern may be set as a reference, and wavelengths included in a predetermined range in which it is possible to detect color irregularity in relation to the reference wavelength may be set as the measurement wavelengths. Accordingly, it is possible to select wavelengths in which the variation in the reflectance of the color irregularity is great as the measurement wavelengths.

The measurement wavelengths may be selected from a wavelength range which uses a wavelength at which the difference between reference values and light quantity values (measured values) of the color irregularity region is greatest, taking into account, in addition to the reflectance of the medium surface, the detection sensitivity of the light receiving element, the dispersion performance of the dispersing element, and the properties of the light source. Accordingly, it is possible to select wavelengths in which the variation in the measured values of the color irregularity is great as the measurement wavelengths.

In the embodiments described above, a configuration is exemplified in which the reflectance is detected for a plurality of measurement positions along the Y direction and the detection of color irregularity is carried out; however, the invention is not limited thereto. For example, as illustrated in FIG. 12, a configuration may be adopted in which the reflectance is detected for a plurality of measurement positions along the X direction while moving the spectrometer 17 along the X direction and carried out the detection of the color irregularity. In this configuration, even when color irregularity in which the gradation fluctuates along the X direction occurs, it is possible to detect the color irregularity.

A configuration may be adopted in which the reflectance is detected for a plurality of measurement positions which are set two dimensionally on an XY plane (for example, on a lattice) and the detection of color irregularity is carried out.

Each of the measurement positions may be set such that the interval between the measurement positions differ alternately for a first row and a second row along the Y direction. Each of the measurement positions may be set such that the interval between the measurement positions differs between the first row and the second row along the X direction.

In the embodiments described above, a configuration is exemplified in which the measurement is carried out at measurement positions of plural points by moving the spectrometer 17; however, the invention is not limited thereto. For example, the light quantity values may be acquired for a plurality of measurement positions at the same time by carrying out surface dispersion for a portion of the measurement target region and acquiring a spectral image for the measurement target wavelength.

In the embodiments described above, a configuration is exemplified in which the color irregularity is detected using the average value of a plurality of reflectances; however, the invention is not limited thereto. For example, the color irregularity may be detected using a portion (an intermediate value excluding the maximum value and the minimum value, for example) of a plurality of measured values which are acquired in the same measurement position.

In the first embodiment, a configuration is exemplified in which the test pattern 3 having red and blue color regions is used; however, the invention is not limited thereto. For example, a test pattern having only one color region which is red or blue may be used, and a test pattern having three color regions including a green one may be used.

The invention is not limited to the test patterns described above, and a test pattern having a color region which is printed in only one color of cyan, magenta, or yellow may be used.

In the second embodiment, a configuration is exemplified in which a test pattern having a green color region is used; however, the invention is not limited thereto. When there is a range in which the low reflectance wavelength range in relation to the test pattern and the high sensitivity wavelength range of the light receiving section 173 overlap, it is possible to apply the invention regardless of the color regions which the test pattern has.

For example, when detecting the color irregularity of a region in which an intermediate gradation (gray) is printed, by selecting a measurement wavelength from the high sensitivity wavelength range of the light receiving section 173, it is possible to detect the variation in the reflectance in the color irregularity region with higher sensitivity. Therefore, it is possible to detect the color irregularity of a region in which an intermediate gradation is printed with high precision.

Note that, as in the second embodiment, when a test pattern is used in which the reflectance is less than or equal to a predetermined value and the test pattern includes a color region in which a plurality of wavelength ranges separated from each other are present, the wavelength range including the wavelength at which the reflectance is least may be selected for the predetermined wavelength range. In this manner, by using a wavelength range including the wavelength at which the reflectance is least as the predetermined wavelength range and selecting the measurement wavelengths from the predetermined wavelength range, it is possible to increase the differences between the measured values and the reference values, and it is possible to detect the color irregularity with high precision.

In the embodiments described above, the carriage movement unit 14 which moves the carriage 13 along the X direction is exemplified; however, the invention is not limited thereto. For example, a configuration may be adopted in which the carriage 13 is fixed and the medium A is moved relative to the carriage 13. In this case, it is possible to suppress the vibration of the variable wavelength interference filter 5 which accompanies the movement of the carriage 13, and it is possible to stabilize the transmission wavelength of the variable wavelength interference filter 5.

The transport unit 12 which moves the medium A along the Y direction is exemplified; however, the invention is not limited thereto. For example, a configuration may be adopted in which the carriage 13 is moved in the Y direction relative to the medium A.

In the embodiments described above, a configuration is exemplified in which the unit control circuit 152 is provided in the control unit 15; however, as described above, the control units may be separate from the control unit 15 and provided in each unit. For example, a configuration may be adopted in which a filter control circuit which controls the variable wavelength interference filter 5 and a light reception control circuit which controls the light receiving section 173 are provided in the spectrometer 17. A configuration may be adopted in which a micro controller and a storage memory which stores V-λ data are embedded in the spectrometer 17, and the micro controller controls the variable wavelength interference filter 5 and the light receiving section 173.

In the embodiments described above, the ink jet type printing section 16 which ejects inks which are supplied from ink tanks by driving piezo elements is exemplified as the printing section 16; however, the invention is not limited thereto. For example, as the printing section 16, a configuration in which bubbles are generated in the ink using a heater to eject the ink, or a configuration in which the ink is ejected by an ultrasonic oscillator may be adopted.

The printing section 16 is not limited to the ink jet type, and, for example, it is possible to apply to printers of any printing system such as a thermal printer using a heat transfer system, a laser printer, a dot impact printer.

In the embodiments described above, the light transmission type variable wavelength interference filter 5 which transmits light of a wavelength corresponding to the gap G between the reflecting films 54 and 55 from the incident light is exemplified as the variable wavelength interference filter 5; however, the invention is not limited thereto. For example, an optically reflective type of variable wavelength interference filter which reflects light of a wavelength corresponding to the gap G between the reflecting films 54 and 55 may be used.

The optical filter device 172 in which the variable wavelength interference filter 5 is stored in the housing 6 is exemplified; however, a configuration may be adopted in which the variable wavelength interference filter 5 is provided directly in the spectrometer 17.

In the embodiments described above, the printer 10 provided with the color irregularity detecting device is exemplified; however, the invention is not limited thereto. For example, the color irregularity detecting device may not be provided with the image forming section and only carry out the color irregularity detection process on the medium A. For example, the color irregularity detecting device of the invention may be incorporated in a quality testing device which performs quality testing of the printed object which is manufactured in a factory or the like, and additionally, the color irregularity detecting device of the invention may be incorporated in any type of device.

The specific structure when carrying out the invention may be formed by combining, as appropriate, the embodiments and modification examples within a scope in which an aspect of the invention can be achieved, and may be changed, as appropriate, to other structures or the like.

The entire disclosure of Japanese Patent Application No. 2015-041189 filed on Mar. 3, 2015 is expressly incorporated by reference herein.

What is claimed is:

1. A color irregularity detecting device comprising:
   a spectrometer which includes a dispersing element and a light receiving element, the dispersing element being configured to disperse light from a measurement target so as to provide dispersed light, the light receiving element being configured to receive the dispersed light from the dispersing element so as to measure a measurement wavelength of the dispersed light;
   a memory configured to store computer-readable instructions and a reference value with respect to a predetermined color; and
   a processor configured to execute the computer-readable instructions so as to:
      cause the spectrometer to measure the measurement wavelength of the dispersed light with respect to the predetermined color so as to provide a measurement result;
      cause the spectrometer to output a measured value corresponding to the measurement result;
      compare the measured value with the reference value so as to provide a comparison result;
      detect color irregularity based on the comparison result,
   wherein the processor is configured to detect the color irregularity when the measured value exceeds an allowable value due to whitening.

2. The color irregularity detecting device according to claim 1,
   wherein the processor is configured to detect the color irregularity when a difference between the measured value and the reference value is greater than or equal to a predetermined threshold.

3. The color irregularity detecting device according to claim 1,
   wherein the measurement wavelength is included in a predetermined wavelength range, and
   wherein the predetermined wavelength range is a wavelength range in which a reflectance when the measurement target of the predetermined color is irradiated with light is less than or equal to a first predetermined value.

4. The color irregularity detecting device according to claim 3,
   wherein the predetermined wavelength range is a wavelength range at which a light reception sensitivity of the light receiving element is greater than or equal to a second predetermined value.

5. The color irregularity detecting device according to claim 1,
   wherein the processor is configured to detect the color irregularity based on a plurality of the measured values which are results of using the spectrometer to measure a plurality of measurement wavelengths of the dispersed light.

6. The color irregularity detecting device according to claim 5,
   wherein the processor is configured to detect the color irregularity based on an average value of the plurality of measured values.

7. The color irregularity detecting device according to claim 1,
   wherein the processor is configured to detect the color irregularity based on a plurality of the measured values which are acquired at each of a plurality of measurement positions on the measurement target.

8. The color irregularity detecting device according to claim 1,
   wherein the dispersing element is a variable wavelength interference filter.

9. An image forming apparatus comprising:
   the color irregularity detecting device according to claim 1; and
   an image forming section which forms an image on a medium.

10. An image forming apparatus comprising:
    the color irregularity detecting device according to claim 2; and
    an image forming section which forms an image on a medium.

11. An image forming apparatus comprising:
    the color irregularity detecting device according to claim 3; and
    an image forming section which forms an image on a medium.

12. An image forming apparatus comprising:
    the color irregularity detecting device according to claim 5; and
    an image forming section which forms an image on a medium.

13. An image forming apparatus comprising:
    the color irregularity detecting device according to claim 6; and
    an image forming section which forms an image on a medium.

14. An image forming apparatus comprising:
the color irregularity detecting device according to claim 7; and
an image forming section which forms an image on a medium.

15. An image forming apparatus comprising:
the color irregularity detecting device according to claim 4; and
an image forming section which forms an image on a medium.

16. An image forming apparatus comprising:
the color irregularity detecting device according to claim 8; and
an image forming section which forms an image on a medium.

17. A color irregularity detecting method for causing a processor to execute computer-readable instructions stored in a memory, the color irregularity detecting method comprising executing on the processor the steps of:
providing a spectrometer, the spectrometer having a dispersing element which is configured to disperse light from a measurement target and a light receiving element which is configured to receive light from the dispersing element;
measuring a measurement wavelength of the light from the measurement target with respect to a predetermined color so as to provide a measurement result;
acquiring a measured value corresponding to the measurement result;
comparing the measured value with a reference value, which is stored in the memory, with respect to the predetermined color so as to provide a comparison result; and
detecting color irregularity based on the comparison result,
wherein the processor is configured to detect the color irregularity when the measured value exceeds an allowable value due to whitening.

18. A color irregularity detecting device comprising:
a light source which emits source light to a measurement target so that the measurement target reflects the source light so as to provide reflected light;
a spectrometer which includes a dispersing element and a light receiving element, the light dispersing element configure to disperse the reflected light from the measurement target so as to provide dispersed light, the light receiving element being configured to receive the dispersed light from the dispersing element so as to measure a measurement wavelength of the dispersed light;
a memory configured to store computer-readable instructions and a reference value with respect to a predetermined color; and
a processor configured to execute the computer-readable instructions so as to:
cause the spectrometer to measure the measurement wavelength of the dispersed light with respect to the predetermined color so as to provide a measurement result;
cause the spectrometer to output a measured value corresponding to the measurement result;
compare the measured value with the reference value so as to provide a comparison result; and
detecting color irregularity based on the comparison result,
wherein the processor is configured to detect the color irregularity when the measured value exceeds an allowable value due to whitening.

* * * * *